(12) United States Patent
Jiang

(10) Patent No.: US 10,393,511 B2
(45) Date of Patent: Aug. 27, 2019

(54) MEASURING DEVICE AND METHOD FOR SUBSTRATE WARPING AMOUNT

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventor: Xuebing Jiang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 129 days.

(21) Appl. No.: 15/658,630

(22) Filed: Jul. 25, 2017

(65) Prior Publication Data
US 2018/0051981 A1 Feb. 22, 2018

(30) Foreign Application Priority Data
Aug. 18, 2016 (CN) .......................... 2016 1 0687178

(51) Int. Cl.
*G01B 11/16* (2006.01)
*G02F 1/13* (2006.01)
*G01B 11/30* (2006.01)

(52) U.S. Cl.
CPC .......... *G01B 11/161* (2013.01); *G01B 11/306* (2013.01); *G02F 1/1309* (2013.01)

(58) Field of Classification Search
CPC ....... G02F 1/13; G02F 1/1309; G01B 11/161; G01B 11/306
(Continued)

(56) References Cited

U.S. PATENT DOCUMENTS 5,467,209 A * 11/1995 Hotta ................ G02F 1/133371
349/122
6,064,462 A * 5/2000 Takeuchi .............. G02F 1/1309
349/192
(Continued)

FOREIGN PATENT DOCUMENTS

CN 101013027 A 8/2007
CN 102128600 A 7/2011
(Continued)

OTHER PUBLICATIONS

Second Office Action for Chinese Patent Application No. 201610687178.7 dated Aug. 10, 2018.
(Continued)

*Primary Examiner* — Michael A Lyons
(74) *Attorney, Agent, or Firm* — Calfee, Halter & Griswold LLP

(57) ABSTRACT

A measuring device and method for a substrate warping amount includes a first substrate and a second substrate disposed oppositely. The measuring device includes a light source, a measuring eyepiece and a processor. The light source is configured to emit a monochromatic light to a region to be measured of the display motherboard, and form a Newton ring interference pattern. The measuring eyepiece is configured to acquire the Newton ring interference pattern and measure a diameter and a corresponding order number of each interference fringe in the Newton ring interference pattern. The processor is connected to the measuring eyepiece and configured to obtain a thickness of an air layer at each interference fringe according to the diameter and the corresponding order number of each interference fringe and a wavelength of the monochromatic light, to obtain a warping amount of the region to be measured of the display motherboard.

9 Claims, 4 Drawing Sheets

(58) Field of Classification Search
USPC .................................................. 65/377, 378
See application file for complete search history.

(56) References Cited

U.S. PATENT DOCUMENTS

| | | | |
|---|---|---|---|
| 2002/0089672 A1* | 7/2002 | Noda | G01B 11/161 |
| | | | 356/505 |
| 2008/0089672 A1 | 4/2008 | Gould et al. | |
| 2018/0239175 A1* | 8/2018 | Wang | G02F 1/1333 |

FOREIGN PATENT DOCUMENTS

| | | |
|---|---|---|
| CN | 102183213 A | 9/2011 |
| CN | 104204720 B | 12/2014 |
| CN | 105700291 A | 6/2016 |
| JP | H10274514 A | 10/1998 |
| JP | 11-037742 A | 2/1999 |
| JP | 2000283777 A | 10/2000 |
| WO | 2006137448 A1 | 12/2006 |

OTHER PUBLICATIONS

First Office Action for Chinese Patent Application No. 201610687178.7 dated May 29, 2018.

* cited by examiner

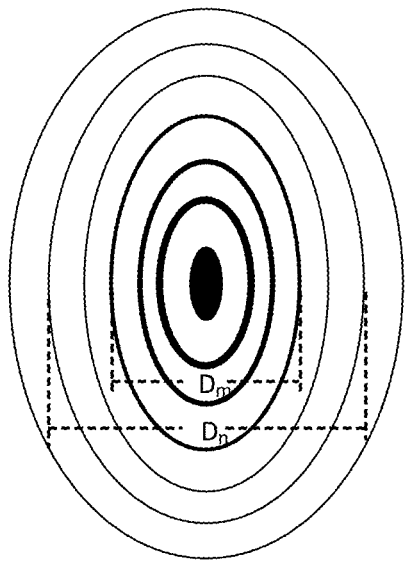

Fig. 5

```
a light source emitting a monochromatic light to a region to be
measured of the display motherboard, and forming a Newton ring      ─── S1
interference pattern at a substrate warping position of the region to be
measured
```
↓
```
a measuring eyepiece acquiring the Newton ring interference pattern
and measuring a diameter and a corresponding order number of each   ─── S2
interference fringe in the Newton ring interference pattern
```
↓
```
a processor obtaining a thickness of an air layer at each interference
fringe according to the diameter and the corresponding order number ─── S3
of each interference fringe and a wavelength of the monochromatic
light, to obtain a warping amount of the region to be measured of the
display motherboard
```

Fig. 6

MEASURING DEVICE AND METHOD FOR SUBSTRATE WARPING AMOUNT

CROSS REFERENCE

The present application claims priority to Chinese Patent Application No. 201610687178.7, filed on Aug. 18, 2016, and the entire contents thereof are incorporated herein by reference.

TECHNICAL FIELD

The present disclosure relates to the field of substrate detection technology, and more particularly, to a measuring device and method for a substrate warping amount.

BACKGROUND

A display panel of a Thin Film Transistor Liquid Crystal Display (TFT-LCD) mainly includes a color film substrate and an array substrate. A periphery of the two substrates is bonded by sealants in a bonding process section. Usually, in the manufacture procedure, in order to prevent the local warping caused by the atmospheric pressure, and in the TFT-LCD process, in order to ensure flatness of the two substrates, a Dummy Sealant and a Loop Sealant for support may be provided outside the Main Sealant at the boundary of the display region corresponding to the display panel.

It should be noted that, information disclosed in the above background portion is provided only for better understanding of the background of the present disclosure, and thus it may contain information that does not form the prior art known by those ordinary skilled in the art.

SUMMARY

The present disclosure provides a measuring device and method for a substrate warping amount.

In the first aspect, the present disclosure provides a measuring device for a substrate warping amount, for measuring the substrate warping amount of a display motherboard. The display motherboard includes a first substrate and a second substrate disposed oppositely. The measuring device includes: a light source, a measuring eyepiece and a processor.

The light source is configured to emit a monochromatic light to a region to be measured of the display motherboard, and form a Newton ring interference pattern at a substrate warping position of the region to be measured.

The measuring eyepiece is configured to acquire the Newton ring interference pattern and measure a diameter and a corresponding order number of each interference fringe in the Newton ring interference pattern.

The processor is connected to the measuring eyepiece and configured to obtain a thickness of an air layer at each interference fringe according to the diameter and the corresponding order number of each interference fringe and a wavelength of the monochromatic light, to obtain a warping amount of the region to be measured of the display motherboard.

The region to be measured of the display motherboard includes: a second substrate which is flat and a first substrate having a curved surface recessed toward the second substrate.

In the second aspect, the present disclosure provides a measuring method for a substrate warping amount, including:

a light source emitting a monochromatic light to a region to be measured of the display motherboard, and forming a Newton ring interference pattern at a substrate warping position of the region to be measured;

a measuring eyepiece acquiring the Newton ring interference pattern and measuring a diameter and a corresponding order number of each interference fringe in the Newton ring interference pattern; and a processor obtaining a thickness of an air layer at each interference fringe according to the diameter and the corresponding order number of each interference fringe and a wavelength of the monochromatic light, to obtain a warping amount of the region to be measured of the display motherboard, wherein the region to be measured of the display motherboard includes: a second substrate which is flat and a first substrate having a curved surface recessed toward the second substrate.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

In order to more clearly illustrate the technical solutions in embodiments of the present disclosure or in the prior art, the following drawings to be used in the description of the embodiments or the prior art will be briefly introduced below. Apparently, drawings in the following description are merely some exemplary embodiments of the present disclosure, other drawings will be obtained based on these drawings for those skilled in the art without creative labor.

FIG. 5 is a schematic view of a Newton ring interference pattern provided by another embodiment of the present disclosure;

FIG. 6 is a schematic flow diagram of a measuring method for a substrate warping amount provided by an embodiment of the present disclosure.

Figure 1:
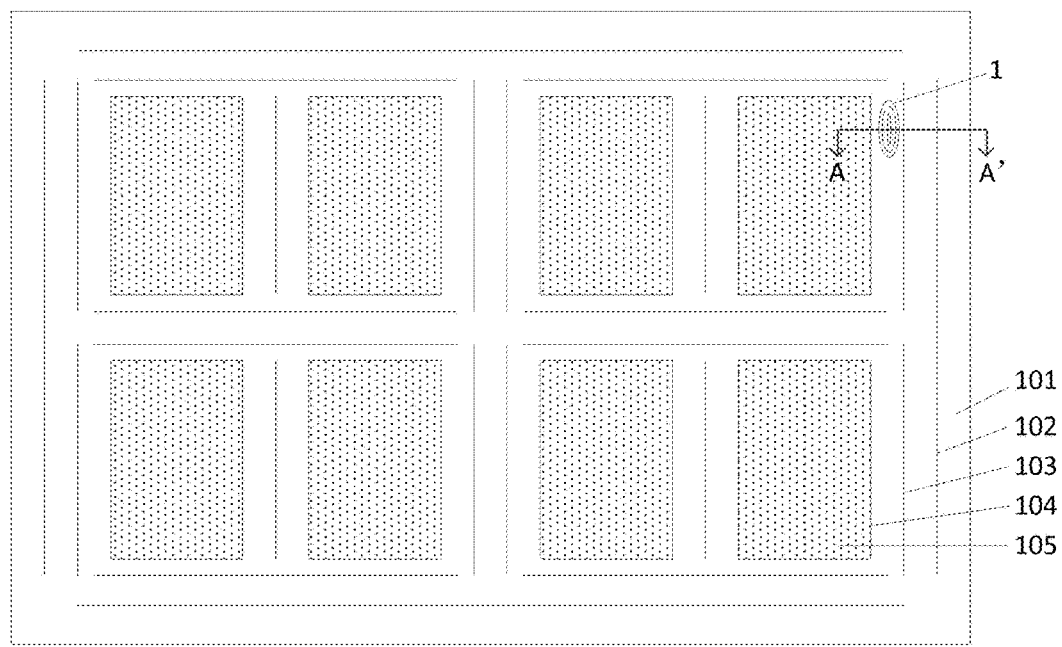
FIG. 1 is a schematic view of a top view of a display motherboard provided by an embodiment of the present disclosure.

Reference numerals in FIG. 1 to FIG. 4 are explained as follows: 101—first substrate, 102—third sealant, 103—second sealant, 104—first sealant, 105—display panel, 106—spacer PS, 107—PS Pillow, 108—gate line, 109—insulating layer, 110—second substrate, 1—Newton ring interference pattern, 200—measuring eyepiece.

DETAILED DESCRIPTION

The technical solutions of embodiments of the present disclosure will be described clearly and completely below with reference to the accompanying drawings of embodiments of the present disclosure. Apparently, the described embodiments are a part of embodiments of the present disclosure, rather than all embodiments. All other embodiments obtained based on the embodiments of the present disclosure by those skilled in the art without creative labor are within the protection scope of the present disclosure.

According to an embodiment of the present disclosure, there is provided a measuring device for a substrate warping amount, for measuring the substrate warping amount of a display motherboard. The display motherboard includes a first substrate and a second substrate disposed oppositely. The measuring device includes: a light source, a measuring eyepiece and a processor.

The light source is configured to emit a monochromatic light to a region to be measured of the display motherboard, and form a Newton ring interference pattern at a substrate warping position of the region to be measured.

The measuring eyepiece is configured to acquire the Newton ring interference pattern and measure a diameter and a corresponding order number of each interference fringe in the Newton ring interference pattern.

The processor is connected to the measuring eyepiece and configured to obtain a thickness of an air layer at each interference fringe according to the diameter and the corresponding order number of each interference fringe and a wavelength of the monochromatic light, to obtain a warping amount of the region to be measured of the display motherboard.

The region to be measured of the display motherboard includes: a second substrate which is flat and a first substrate having a curved surface recessed toward the second substrate.

Figure 3:
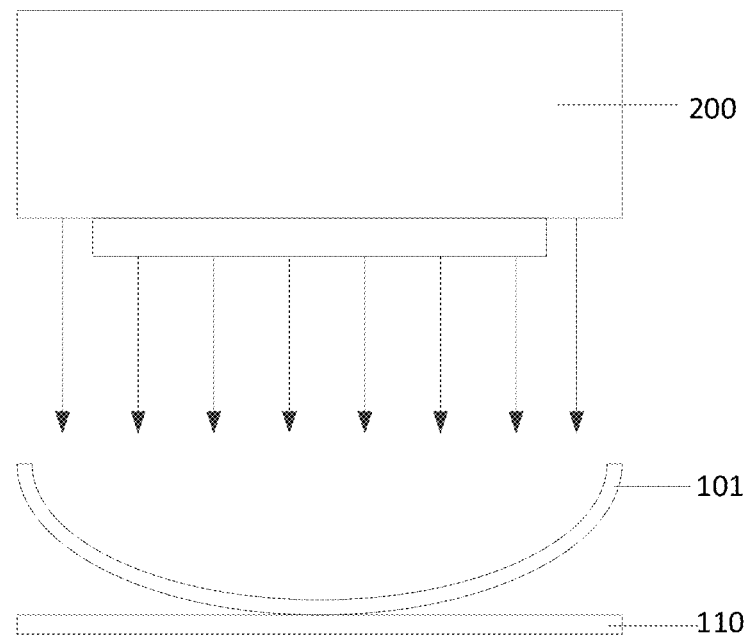
FIG. 3 is a structural schematic view of a measuring device for a substrate warping amount provided by an embodiment of the present disclosure.

For example, a measuring device for a substrate warping amount as shown in FIG. 3 includes: a measuring eyepiece 200 having a monochromatic light emitting function and a processor (not shown in FIG. 3). The measuring device is used to measure the substrate warping amount of the display motherboard.

Figure 2:
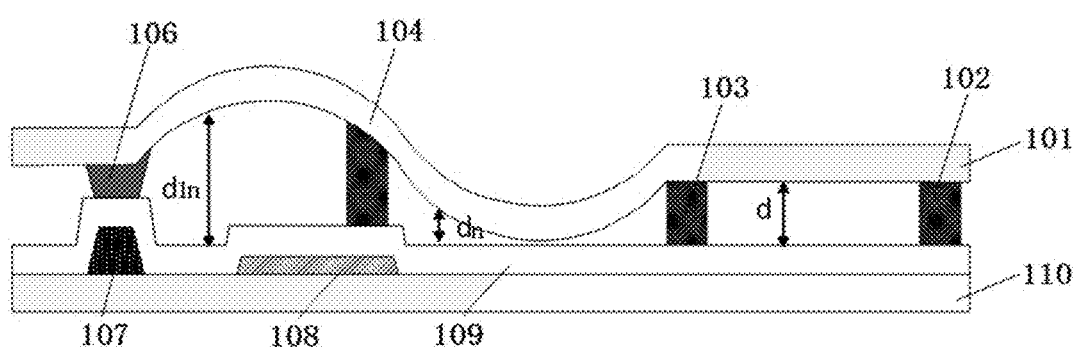
FIG. 2 is a cross sectional schematic view taken along a line A-A' of a display motherboard shown in FIG. 1 provided by an embodiment of the present disclosure.

Specifically, FIG. 1 is a schematic view of a top view of a display motherboard, and FIG. 2 is a cross sectional schematic view taken along a line A-A' of a display motherboard as shown in FIG. 1. The display motherboard includes: a first substrate 101 and a second substrate 110 disposed oppositely, and a first sealant 104, a second sealant 103 and a third sealant 102 provided between the first substrate 101 and the second substrate 110 and configured to seal the first substrate 101 and the second substrate 110. In the embodiment, the first sealant 104 defines a plurality of display panels 105. The second sealant 103 surrounds a preset number of display panels 105 and defines a plurality of closed regions. The third sealant 102 is disposed in a peripheral region of the first substrate 101 and the second substrate 110.

Due to the influence of atmospheric pressure, substrate warping tends to be formed between the first sealant 104 (Main Sealant) and the second sealant 103 (Dummy Sealant). Especially in regions where the support of the Dummy Pattern is weak, the above phenomenon is more evident. As shown in FIG. 2, according to the laws of the lever effect, after a substrate in a non-display region is recessed downward, a substrate surrounding a display region will be wrapped upward inevitably, resulting in a higher cell gap in part of the display region, and resulting in a display defect (such as, local yellowing).

Further, when the monochromatic light emitted from a measuring eyepiece 200 of the measuring device for a substrate warping amount as shown in FIG. 3 is used to irradiate the region to be measured of the display motherboard, as shown in FIG. 1, a Newton ring interference pattern 1 occurs between the first sealant 104 and the second sealant 103. The measurement eyepiece 200 acquires the Newton ring interference pattern 1 and measures a diameter and a corresponding order number of each interference fringe in the Newton ring interference pattern. The processor obtains a thickness of an air layer at each interference fringe according to the diameter and the corresponding order number of each interference fringe and a wavelength of the monochromatic light, to obtain a warping amount of the region to be measured of the display motherboard, that is, to obtain the warping amount of the first substrate 101 corresponding to the region to be measured of the display motherboard.

It can be seen that, the present embodiment adopts the monochromatic light emitted from the light source to irradiate the warping substrate, the interference fringe phenomenon is caused, the warping amount of the substrate is measured, and thereby a degree of partial yellowing is estimated. And then in the manufacture procedure, the local yellowing is monitored, to avoid waste of materials.

Further, in an optional embodiment of the present disclosure, the processor is further configured to:

when the Newton ring interference pattern is located between the first sealant and the second sealant, obtain a cell gap at an edge of a display region of the display panel adjacent to the Newton ring interference pattern according to the thickness of the air layer at each interference fringe and a preset cell gap; and determine a degree of yellowing at the edge of the display region according to the cell gap of the edge of the display region.

Specifically, the processor is configured to:

obtain the thickness of the air layer at each interference fringe using Equation (1) according to the diameter and the corresponding order number of each interference fringe and the wavelength of the monochromatic light:

$$d_n = \frac{(n-m)}{2} \frac{D_n^2}{D_n^2 - D_m^2} \lambda \quad (1)$$

wherein n and m represent the order number of interference fringe and n>m, $d_n$ is a thickness of the air layer at the $n^{th}$ order interference fringe, $D_n$ is a diameter of the $n^{th}$ order interference fringe, $D_m$ is a diameter of the $m^{th}$ order interference fringe, and $\lambda$ is the wavelength of the monochromatic light.

It is to be noted that, since the interference fringes include bright fringes and dark fringes, the interference fringe in the above Equation (1) is a bright fringe or a dark fringe. For example, in the case of dark fringes, a dark point in the center of the Newton ring interference pattern corresponds to the $0^{th}$ order dark fringe, and the order numbers of the dark fringes are the $1^{st}$ order, the $2^{nd}$ order, . . . , and so on outward.

Figure 4:
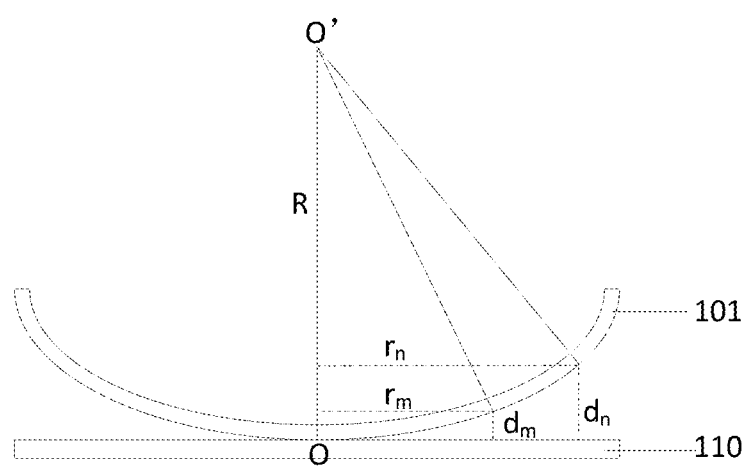
FIG. 4 is a schematic view for measuring of a measurement device for a substrate warping amount provided by another embodiment of the present disclosure.

As shown in FIG. 4, the warping position of the two substrates will form a wedge-shaped air thin layer between the two substrates. According to the laws of light interference, it is known that when the monochromatic light is incident vertically, the incident light will reflect on the upper and lower surfaces of the air thin layer in sequence. An optical path difference exists between the two reflected lights. The interference phenomenon occurs when the two reflected lights encounter on a lens surface, and interference fringes (ie, the Newton ring) are formed. In FIG. 4, the glass 101 having a larger radius of curvature and the plane glass 110 intersect at a point O. The curved glass 101 has a curvature center of O' and the curvature radius of R. The thickness of the air thin layer is set as d, and coherent interference fringes will be formed at a position the same as d. Such kind of interference fringes is a series of bright and dark concentric rings (elliptical shapes generated in practical manufacture) centered on the contact point O. The series of rings is called a Newton ring.

According to the Newton ring interference pattern as shown in FIG. 5, the $m^{th}$ order and the $n^{th}$ order interference fringes are studied, and the thickness of the air layer corresponding to interference fringes of different orders may be obtained according to the above Equation (1). It can be seen from the Equation (1), it is possible to obtain the thickness $d_n$ of the air layer at the $n^{th}$ order interference fringe, as long as the wavelength λ of the monochromatic light is known, the radii $D_m$ and $D_n$ of the two interference fringes and the difference n-m of the order numbers may be measured.

Further, specifically, the processor is configured to:

obtain the cell gap at the edge of the display region adjacent to the Newton ring interference pattern using Equation (2) according to the thickness of the air layer at each interference fringe and the preset cell gap:

$$d1_n - d = d - d_n \qquad (2)$$

wherein $d1_n$ is the cell gap at the edge of the display region, d is the preset cell gap, $d_n$ is the thickness of the air layer at the interference fringe, and a distance from $d_n$ to a first sealant at a boundary of the display region and a non-display region is equal to a distance from $d1_n$ to the first sealant.

As shown in FIG. 2, the design is $d1_n = d_n = d$ originally, but due to the impact of the lever effect, it will easily causes $d1_n > d > d_n$, where $d1_n$ is the edge of the display region. Due to the increase of $d1_n$, especially the increase of $d1_n$ locally, local yellowing phenomenon will occur at the edge of the display panel. The higher the $d1_n$ increases, the more serious the local yellowing phenomenon will be (according to experience, the degree of the local yellowing will not be accepted when $d1_n - d > 0.2$ μm).

Due to the lever effect, taking the first sealant 104 as a fulcrum, the left side of the first sealant 104 will present a rising trend. A distance between the two substrates on the edge of the display region is $d1_n$, and the above Equation (2) may be obtained from the geometric relationship. Thus, a series of $d_n$ of the non-display region may be measured through the above Equation (2), and then a series of $d1_n$ values of the display region of the corresponding position may be obtained according to the known d.

Further, the processor is further configured to:

determine the degree of yellowing at the edge of the display region corresponding to $d1_n$ based on a value of $d1_n - d$.

Specifically, the degree of local yellowing may be determined by comparing the value of $d1_n - d$ with an empirical value. The greater the value of $d1_n - d$ is, the more serious the local yellowing phenomenon will be. In this way, by measuring the diameter of the Newton ring interference pattern corresponding to the region between the first sealant 104 and the second sealant 103, and by calculating the size of the cell gap of the edge of the display region, the degree of local yellowing may be determined.

FIG. 6 is a schematic flow diagram of a measuring method for a substrate warping amount provided by an embodiment of the present disclosure. As shown in FIG. 6, the method includes the following steps.

S1: a light source emits a monochromatic light to a region to be measured of the display motherboard, and a Newton ring interference pattern is formed at a substrate warping position of the region to be measured.

Specifically, a light source emits a monochromatic light to a region to be measured of the display motherboard, and if the substrate of the region to be measured is warped, a Newton ring interference pattern will be formed.

S2: a measuring eyepiece acquires the Newton ring interference pattern and measuring a diameter and a corresponding order number of each interference fringe in the Newton ring interference pattern.

S3: a processor obtains a thickness of an air layer at each interference fringe according to the diameter and the corresponding order number of each interference fringe and a wavelength of the monochromatic light, to obtain a warping amount of the region to be measured of the display motherboard.

In the embodiment, the region to be measured of the display motherboard includes: a second substrate which is flat and a first substrate having a curved surface recessed toward the second substrate.

It can be seen that, the present embodiment adopts the monochromatic light emitted from the light source to irradiate the warping substrate, the interference fringe phenomenon is caused, the warping amount of the substrate is measured, and thereby a degree of partial yellowing is estimated. And then in the manufacture procedure, the local yellowing is monitored, to avoid waste of materials.

In the present embodiment, specifically, step S1 includes:

the light source emitting a plurality of beams of monochromatic light perpendicular to the second substrate to the region to be measured of the display motherboard, and forming the Newton ring interference pattern at the substrate warping position of the region to be measured.

Figure 7:
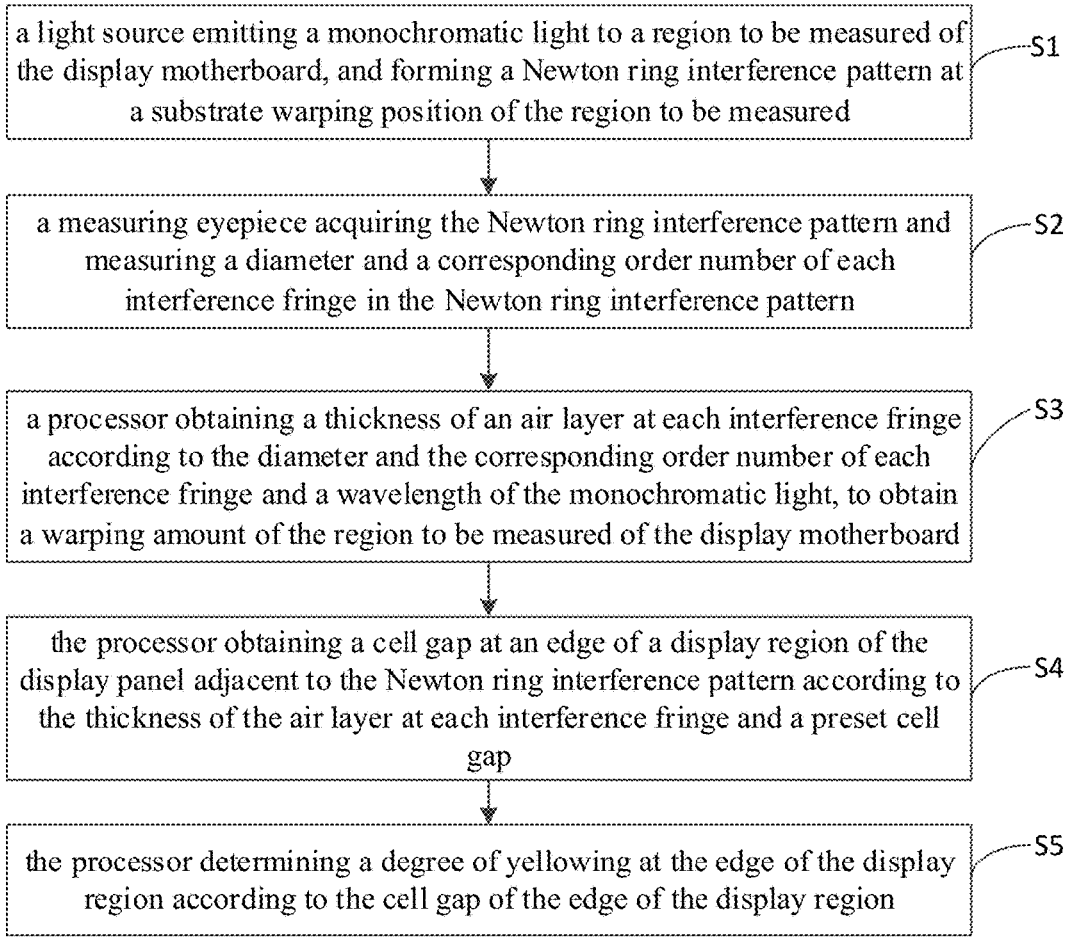
FIG. 7 is a schematic flow diagram of a measuring method for a substrate warping amount provided by another embodiment of the present disclosure.

Further, as shown in FIG. 7, the method further includes the following steps.

S4: the processor obtains a cell gap at an edge of a display region of the display panel adjacent to the Newton ring interference pattern according to the thickness of the air layer at each interference fringe and a preset cell gap.

S5: the processor determines a degree of yellowing at the edge of the display region according to the cell gap of the edge of the display region.

Specifically, the obtaining a thickness of an air layer at each interference fringe according to the diameter and the corresponding order number of each interference fringe and a wavelength of the monochromatic light in step S3 includes:

obtaining the thickness of the air layer at each interference fringe using Equation 1 according to the diameter and the corresponding order number of each interference fringe and the wavelength of the monochromatic light:

$$d_n = \frac{(n-m)}{2} \frac{D_n^2}{D_n^2 - D_m^2} \lambda \qquad \text{Equation 1}$$

wherein n and m represent the order number of interference fringe and n>m, $d_n$ is a thickness of the air layer at the $n^{th}$ order interference fringe, $D_n$ is a diameter of the $n^{th}$ order interference fringe, $D_m$ is a diameter of the $m^{th}$ order interference fringe, and $\lambda$ is the wavelength of the monochromatic light.

Further, specifically, step S4 includes:

obtaining the cell gap at the edge of the display region adjacent to the Newton ring interference pattern using Equation 2 according to the thickness of the air layer at each interference fringe and the preset cell gap:

$$d1_n - d = d - d_n \quad \text{Equation 2}$$

wherein $d1_n$ is the cell gap at the edge of the display region, d is the preset cell gap, $d_n$ is the thickness of the air layer at the interference fringe, and a distance from $d_n$ to a first sealant at a boundary of the display region and a non-display region is equal to a distance from $d1_n$ to the first sealant.

Further, specifically, step S5 includes:

determining the degree of yellowing at the edge of the display region corresponding to $d1_n$ based on a value of $d1_n - d$.

In this way, in the present embodiment, by measuring the diameter of the Newton ring interference pattern corresponding to the region between the first sealant and the second sealant, and by calculating the size of the cell gap of the edge of the display region, the degree of local yellowing may be determined. Thus, the local yellowing is monitored in the manufacture procedure, to avoid waste of materials.

In an optional embodiment of the present disclosure, in addition to the above steps, the method further includes the following step:

the processor obtaining a deformation curve of the first substrate of a corresponding region of the Newton ring interference pattern according to a interpolation calculation.

It should be noted that, the measuring device and method for a substrate warping amount in any of the above embodiments are suitable for TFT-LCD processes of various modes, such as TN, ADS, VA, IPS.

According to the embodiments of the present disclosure, the present disclosure provides a measuring device and method for a substrate warping amount. The light source emits a monochromatic light to a region to be measured of the display motherboard, and the substrate warping of the region to be measured may be determined according to the formed Newton ring interference pattern. The measuring eyepiece acquires the Newton ring interference pattern and obtains the thickness of the air thin layer of the warping position of the non-display region according to the Newton ring interference pattern, such that the warping amount of the region to be measured of the display motherboard is obtained. In this way, a cell gap at an edge of a display region of the display panel adjacent to the Newton ring interference pattern will be easily obtained according to the warping amount, thus determining the degree of yellowing at the edge of a display region. Thus, the local yellowing is monitored in the manufacture procedure, to avoid waste of materials.

In the description of the present disclosure, it is to be noted that the orientation or positional relationships indicated by terms "upper", "lower" and the like are based on the orientation or positional relationships as shown in the drawings, only for ease of describing the present disclosure and simplifying the description, rather than indicating or implying that the device or element referred to must have a specific orientation, constructed and operated in a particular orientation, and therefore it cannot be construed as limiting the present disclosure. Unless otherwise explicitly stated and limited, the terms "install", "connected with", "connected" should be understood in a broad sense. For example, it may be fixed connection, detachable connection or integral connection. It may also be mechanical connection or electrically connection. It may be connected directly, indirectly connected through an intermediate medium, or be internal connectivity of two elements. The specific meaning of the above mentioned terms in the present disclosure can be understood by those skilled in the art in light of specific circumstances.

It should also be noted that, in this context, the relational terms such as the first and the second or the like are merely used to distinguish one entity or operation from another entity or operation, without necessarily requiring or implying that any of such actual relationships or sequences exists between these entities or operations. Moreover, the terms "include", "comprise" or any other variants thereof are intended to encompass non-exclusive inclusion, such that the process, method, article, or device that includes a series of elements not only includes those elements but also includes other elements that are not explicitly listed, or further includes elements that are inherent to such a process, method, article, or device. In the absence of more restrictions, the elements defined by the sentence "including a . . . " do not preclude the presence of additional same elements in the process, method, article, or device that includes the elements.

The foregoing embodiments are merely illustrative of the technical solutions of the present disclosure and are not intended to be limiting thereof; although the present disclosure has been described in detail with reference to the foregoing embodiments, it will be understood by those skilled in the art that: the technical solutions described in the foregoing embodiments may be modified, or some of the technical features may be equivalently replaced, and these modifications or substitutions do not cause the essence of the corresponding technical solutions to depart from the spirit and scope of the technical solutions of embodiments of the present disclosure.

What is claimed is:

1. A measuring device for a substrate warping amount, for measuring the substrate warping amount of a display motherboard, wherein the measuring device comprises a light source configured to emit a monochromatic light to a region to be measured of the display motherboard and form a Newton ring interference pattern at a substrate warping position of the region to be measured;

a measuring eyepiece configured to acquire the Newton ring interference pattern and measure a diameter and a corresponding order number of each interference fringe in the Newton ring interference pattern; and a processor connected to the measuring eyepiece and configured to obtain a thickness of an air layer at each interference fringe according to the diameter and the corresponding order number of each interference fringe and a wavelength of the monochromatic light, to obtain a warping amount of the region to be measured of the display motherboard, wherein the region to be measured of the display motherboard comprises: a second substrate which is flat and a first substrate having a curved surface recessed toward the second substrate, and wherein the processor is configured to:

obtain the thickness of the air layer at each interference fringe using Equation 1 according to the diameter and the corresponding order number of each interference fringe and the wavelength of the monochromatic light:

$$d_n = \frac{(n-m)}{2} \frac{D_n^2}{D_n^2 - D_m^2} \lambda \qquad \text{Equation 1}$$

wherein n and m represent the order number of interference fringe and n>m, $d_n$ is a thickness of the air layer at the $n^{th}$ order interference fringe, $D_n$ is a diameter of the $n^{th}$ order interference fringe, $D_m$ is a diameter of the $m^{th}$ order interference fringe, and $\lambda$ is the wavelength of the monochromatic light.

2. The measuring device according to claim 1, wherein the processor is further configured to:
 obtain a cell gap at an edge of a display region of the display motherboard adjacent to the Newton ring interference pattern according to the thickness of the air layer at each interference fringe and a preset cell gap; and
 determine a degree of yellowing at the edge of the display region according to the cell gap of the edge of the display region.

3. The measuring device according to claim 2, wherein the processor is configured to:
 obtain the cell gap at the edge of the display region adjacent to the Newton ring interference pattern using Equation 2 according to the thickness of the air layer at each interference fringe and the preset cell gap:

$$d1_n - d = d - d_n \qquad \text{Equation 2}$$

wherein $d1_n$ is the cell gap at the edge of the display region, d is the preset cell gap, $d_n$ is the thickness of the air layer at the interference fringe, and a distance from $d_n$ to a first sealant at a boundary of the display region and a non-display region is equal to a distance from $d1_n$ to the first sealant.

4. The measuring device according to claim 3, wherein the processor is further configured to:
 determine the degree of yellowing at the edge of the display region corresponding to $d1_n$ based on a value of $d1_n - d$.

5. A measuring method for a substrate warping amount of a display motherboard, comprising:
 emitting a monochromatic light from a light source to a region to be measured of the display motherboard and forming a Newton ring interference pattern at a substrate warping position of the region to be measured;
 acquiring the Newton ring interference pattern with a measuring eyepiece and measuring a diameter and a corresponding order number of each interference fringe in the Newton ring interference pattern; and
 obtaining a thickness of an air layer at each interference fringe with a processor according to the diameter and the corresponding order number of each interference fringe and a wavelength of the monochromatic light, to obtain a warping amount of the region to be measured of the display motherboard,
 wherein the region to be measured of the display motherboard comprises: a second substrate which is flat and a first substrate having a curved surface recessed toward the second substrate, and
 wherein the obtaining a thickness of an air layer at each interference fringe with a processor according to the diameter and the corresponding order number of each interference fringe and a wavelength of the monochromatic light comprises:
 obtaining the thickness of the air layer at each interference fringe using Equation 1 according to the diameter and the corresponding order number of each interference fringe and the wavelength of the monochromatic light:

$$d_n = \frac{(n-m)}{2} \frac{D_n^2}{D_n^2 - D_m^2} \lambda \qquad \text{Equation 1}$$

wherein n and m represent the order number of interference fringe and n>m, $d_n$ is a thickness of the air layer at the $n^{th}$ order interference fringe, $D_n$ is a diameter of the $n^{th}$ order interference fringe, $D_m$ is a diameter of the $m^{th}$ order interference fringe, and $\lambda$ is the wavelength of the monochromatic light.

6. The measuring method according to claim 5, wherein the emitting a monochromatic light from a light source to a region to be measured of the display motherboard and forming a Newton ring interference pattern at a substrate warping position of the region to be measured comprises:
 emitting a plurality of beams of monochromatic light perpendicular to the second substrate from the light source to the region to be measured of the display motherboard, and forming the Newton ring interference pattern at the substrate warping position of the region to be measured.

7. The measuring method according to claim 5, further comprising:
 obtaining a cell gap at an edge of a display region of the display motherboard adjacent to the Newton ring interference pattern with the processor according to the thickness of the air layer at each interference fringe and a preset cell gap; and
 determining a degree of yellowing at the edge of the display region with the processor according to the cell gap of the edge of the display region.

8. The measuring method according to claim 7, wherein the obtaining a cell gap at an edge of a display region of the display panel adjacent to the Newton ring interference pattern with the processor according to the thickness of the air layer at each interference fringe and a preset cell gap comprises:
 obtaining the cell gap at the edge of the display region adjacent to the Newton ring interference pattern using Equation 2 according to the thickness of the air layer at each interference fringe and the preset cell gap:

$$d1_n - d = d - d_n \qquad \text{Equation 2}$$

wherein $d1_n$ is the cell gap at the edge of the display region, d is the preset cell gap, $d_n$ is the thickness of the air layer at the interference fringe, and a distance from $d_n$ to a first sealant at a boundary of the display region and a non-display region is equal to a distance from $d1_n$ to the first sealant.

9. The measuring method according to claim 7, wherein the determining a degree of yellowing at the edge of the display region with the processor according to the cell gap of the edge of the display region comprises:
 determining the degree of yellowing at the edge of the display region corresponding to $d1_n$ based on a value of $d1_n - d$.

* * * * *